United States Patent [19]

Rohde

[11] Patent Number: 5,665,181
[45] Date of Patent: Sep. 9, 1997

[54] METHOD AND PRODUCTION PLANT FOR PRODUCING HOT-ROLLED WIDE STRIP

[75] Inventor: Wolfgang Rohde, Dormagen, Germany

[73] Assignee: SMS Schloemann-Siemag Aktiengesellschaft, Düsseldorf, Germany

[21] Appl. No.: 540,309

[22] Filed: Oct. 6, 1995

[30] Foreign Application Priority Data

May 13, 1994 [DE] Germany ............ 44 16 752.0

[51] Int. Cl.⁶ ............ B22D 11/124; C21D 9/573
[52] U.S. Cl. ............ 148/541
[58] Field of Search ............ 148/541, 661

[56] References Cited

FOREIGN PATENT DOCUMENTS 0587150  3/1994  European Pat. Off. .
58-164751  9/1983  Japan ............ 148/541
61-243118  10/1986  Japan ............ 148/541

*Primary Examiner*—Deborah Yee
*Attorney, Agent, or Firm*—Friedrich Kueffner

[57] ABSTRACT

In a method for the production of hot-rolled wide strip in a production plant which includes a continuous casting plant for thin slabs having a thickness of between 40 and 70 mm, an equalizing furnace and a rolling mill, wherein the temperature of the thin slab when exiting the continuous casting plant is above 950° C., the surface temperature of the slab is lowered between the continuous casting machine and the equalizing furnace over a sufficient depth of the slab, so that a conversion of the structure from austenite to ferrite/perlite takes place.

5 Claims, 2 Drawing Sheets

METHOD AND PRODUCTION PLANT FOR PRODUCING HOT-ROLLED WIDE STRIP

BACKGROUND OF THE INVENTION

1. Field of the Invention

The present invention relates to a method for the production of hot-rolled wide strip in a production plant which includes a continuous casting plant for thin slabs having a thickness of between 40 and 70 mm, an equalizing furnace and a rolling mill, wherein the temperature of the thin slab when exiting the continuous casting plant is above 950° C.

The present invention also relates to a production plant for carrying out the method.

2. Description of the Related Art

In a production plant for the economical production of hot-rolled wide strip which has become known under the name CSP-plant, a thin slab having a thickness of 40 to 70 mm is rolled in a multiple-stand rolling mill train directly after being produced in the continuous casting plant and after the temperature equalization. The temperature of the thin slab after leaving the continuous casting plant is usually between 950° and 1100° C. A temperature of, for example, 1100° C. which is uniform over the slab thickness and slab length is adjusted in the roller hearth furnace.

The method carried out in the above-described plant is characterized by the fact that no austenite to ferrite/perlite conversion takes place before the first deformation in the rolling mill train. The primary austenite obtained after the solidification in the continuous casting plant remains unchanged up to the first deformation in the rolling mill train.

The described method ensures the highest possible savings in energy, particularly in those embodiments in which the temperature following the continuous casting plant is slightly below the desired temperature following the roller hearth furnace. In these cases, the energy required for the temperature equalization in the roller hearth furnace can be reduced to an absolute minimum.

This method has been found very useful for the use of first-choice scrap with admixtures of directly reduced iron as well as for the use of converter-treated crude steel. However, disadvantages are expected when the method is used with second-choice scrap, particularly with admixtures of copper. During the formation of scale as the steel travels through the roller hearth furnace, the released copper will collect at the grain boundaries of the primary austenite and loosen the interconnection of the grain boundaries in the surface area. Depending on the degree of the copper content and depending on the degree of scaling, this phenomenon may lead to the so-called solder breakage during the deformation in the subsequent rolling mill train.

SUMMARY OF THE INVENTION

Therefore, it is the primary object of the present invention to provide a method for the production of hot-rolled wide strip and a plant for carrying out the method in which second-choice scrap can be used without disadvantage.

In accordance with the present invention, between the continuous casting machine and the equalizing furnace, the surface temperature of the slab is lowered over a sufficient depth thereof, so that a conversion of the structure from austenite to ferrite/perlite takes place.

The plant for carrying out the method according to the present invention includes a cooling stretch arranged between the continuous casting plant and the equalizing furnace, wherein the cooling stretch is a water cooling stretch and is composed of several cooling beams which can be switched on and off.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 2:
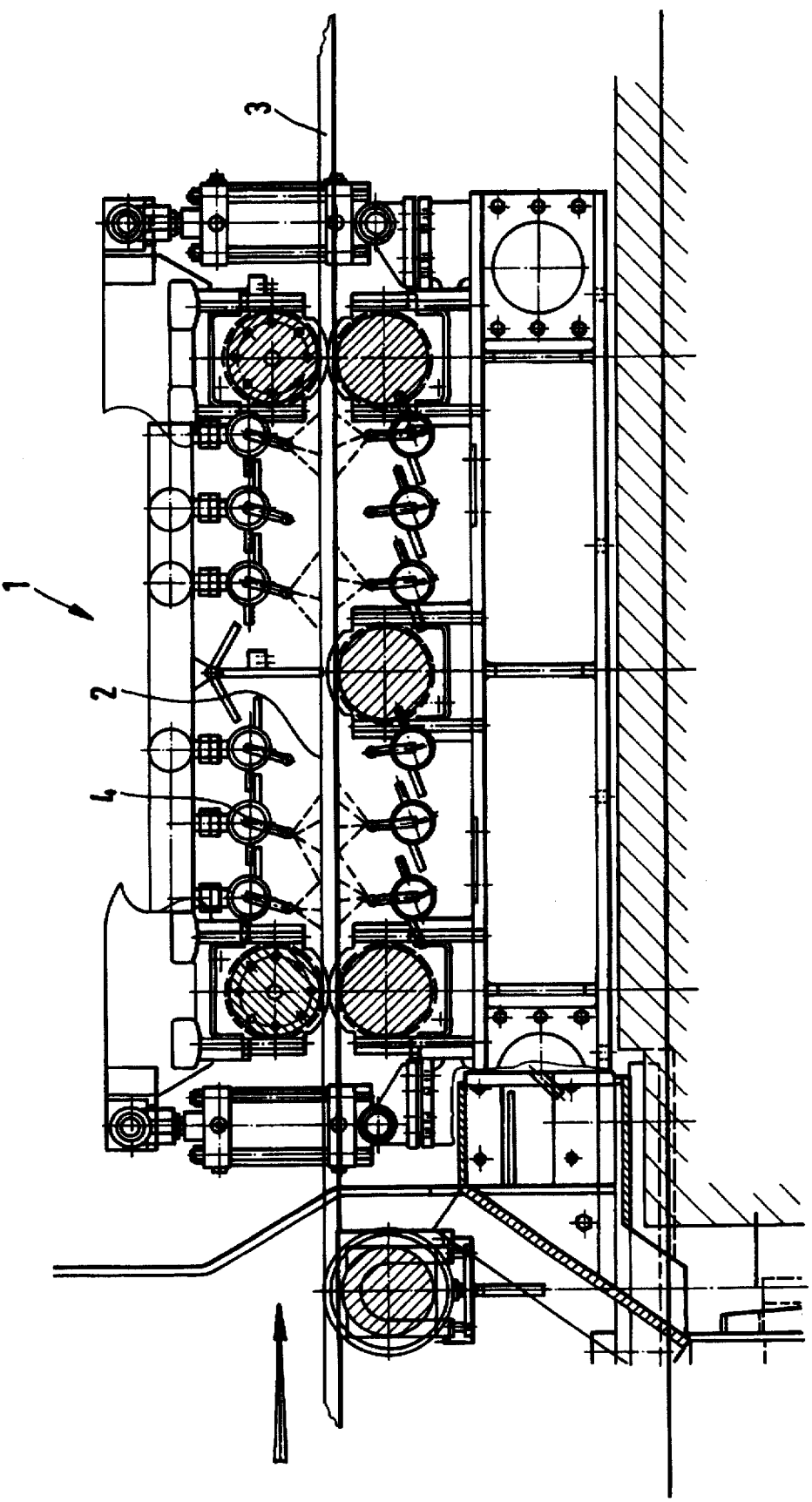
FIG. 2 is a schematic illustration of a cooling stretch used in the plant according to the present invention.

As shown in FIG. 2 of the drawing, an intensive cooling stretch 1 is arranged in front of the inlet of a roller hearth furnace, not shown. The cooling stretch 1 is a water cooling stretch with several cooling beams 4 which can be switched on and off. In the cooling stretch 1, the temperature at the surface 2 of the thin slab 3 is lowered in a sufficient depth of the thin slab 3 to a temperature below $A_r3$. This forces a conversion of the structure with a new orientation of the austenite grain boundaries after reheating in the roller hearth furnace.

As can be concluded from FIG. 1 of the drawing, the intensity of the cooling stretch 1 is selected in such a way that, for ensuring a sufficient conversion of the structure up to a depth of at least 2 mm, the temperature falls below 600° C., while the average temperature on the slab surface remains above the martensite threshold of the respective material quality.

Figure 1:
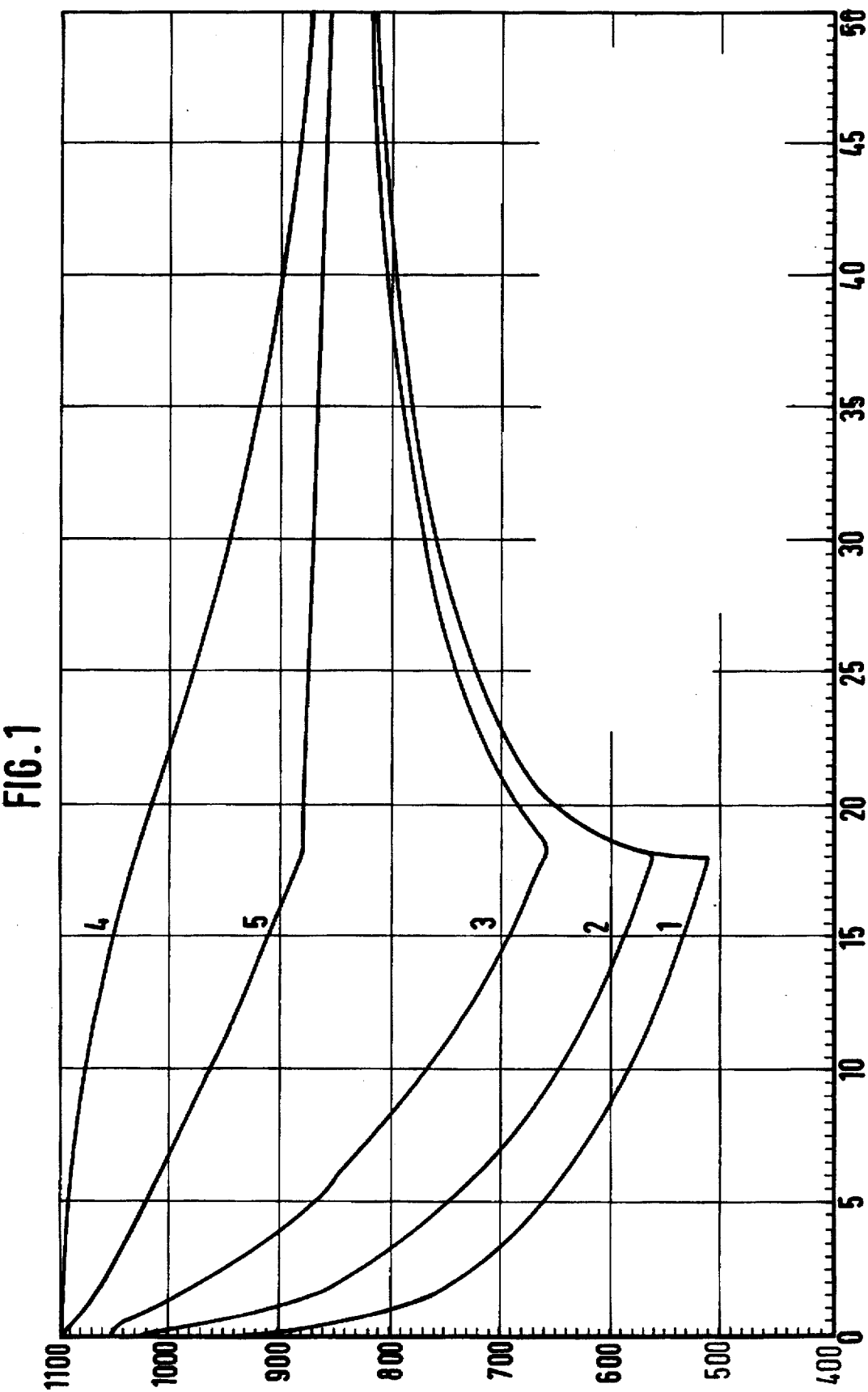
FIG. 1 is a diagram showing the temperature of the steel over time for various depths.

Specifically, curve 1 of FIG. 1 shows the temperature in degrees Celsius over time in seconds at the slab surface. Curve 2 shows the temperature over time at a depth of 1.3 mm from the slab surface. Curve 3 shows the temperature over time at a depth of 3.9 mm from the slab surface. Curve 4 shows the temperature over time at the core of the slab. Curve 5 shows the average temperature over time (alpha average=3000 W/n 2/K).

The minimum depth up to which the temperature is to drop below 600° C. is determined from the minimum time period required for the conversion of at least 70% of austenite to ferrite/perlite. In view of the desired minimization of the energy requirement for the subsequent reheating, the cooling depth and cooling period are kept as low as possible.

The invention is not limited by the embodiments described above which are presented as examples only but can be modified in various ways within the scope of protection defined by the appended patent claims.

I claim:

1. A method for the production of hot-rolled wide strip in a production plant including a continuous casting plant for thin slab having a thickness of between 40 and 70 mm, an equalizing furnace and a rolling mill, wherein the thin slab has a temperature when leaving the continuous casting plant which is above 950° C., the method comprising lowering the temperature of the slab between the continuous casting plant and the equalizing furnace over a sufficient depth from a surface of the slab, so that a structure conversion from austenite to ferrite/perlite occurs.

2. The method according to claim 1, comprising lowering the temperature of the thin slab to a depth of at least 2 mm from the surface of the slab to a temperature below 600° C.

3. The method according to claim 1, wherein the thin slab is of a material having a quality and a martensite threshold, comprising lowering the temperature of the thin slab so that an average surface temperature of the thin slab does not fall below the martensite threshold of the material quality.

4. The method according to claim 1, comprising selecting a cooling time so that at least 70% austenite are converted to ferrite/perlite.

5. The method according to claim 1, wherein the temperature is lowered in a cooling stretch having individual cooling sections which can be switched on and off, further comprising lowering the temperature of the thin slab in dependence on a casting speed and desired minimum values for cooling depth, cooling temperature, cooling time and martensite threshold.

* * * * *